(12) United States Patent
Behrmann et al.

(10) Patent No.: US 7,050,662 B2
(45) Date of Patent: May 23, 2006

(54) FIBER BRAGG GRATING COMPRESSION SENSOR SYSTEM

(75) Inventors: Gregory P. Behrmann, Stevensville, MD (US); Dennis W. Prather, Newark, DE (US)

(73) Assignee: EM Photonics, Inc., Newark, DE (US)

( * ) Notice: Subject to any disclaimer, the term of this patent is extended or adjusted under 35 U.S.C. 154(b) by 0 days.

(21) Appl. No.: 10/992,047

(22) Filed: Nov. 18, 2004

(65) Prior Publication Data

US 2005/0220407 A1    Oct. 6, 2005

Related U.S. Application Data

(60) Provisional application No. 60/523,370, filed on Nov. 19, 2003.

(51) Int. Cl.
*G02B 6/00* (2006.01)

(52) U.S. Cl. .......................................... 385/13; 385/37
(58) Field of Classification Search .................... 385/13
See application file for complete search history.

(56) References Cited

U.S. PATENT DOCUMENTS 6,016,702 A * 1/2000 Maron ........................... 73/705
6,668,105 B1 * 12/2003 Chen et al. ..................... 385/13

* cited by examiner

*Primary Examiner*—Sung Pak
(74) *Attorney, Agent, or Firm*—Connolly Bove Lodge & Hutz LLP; Larry J. Hume

(57) ABSTRACT

A fiber Bragg grating compression sensor and a flexure mount that is attached to the sensor to significantly enhance its compression sensitivity. By incorporating the flexure mount, compressive forces are converted to tensile forces allowing an entire new set of measurement possibilities. The sensor may be used in implantable tendon and ligament force sensing or as a generalized compression sensor.

14 Claims, 1 Drawing Sheet

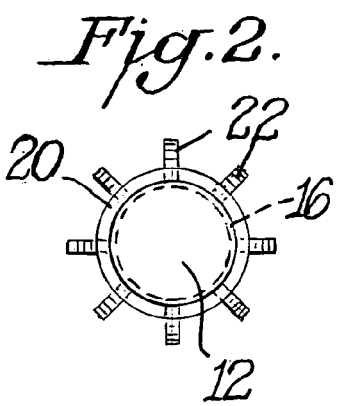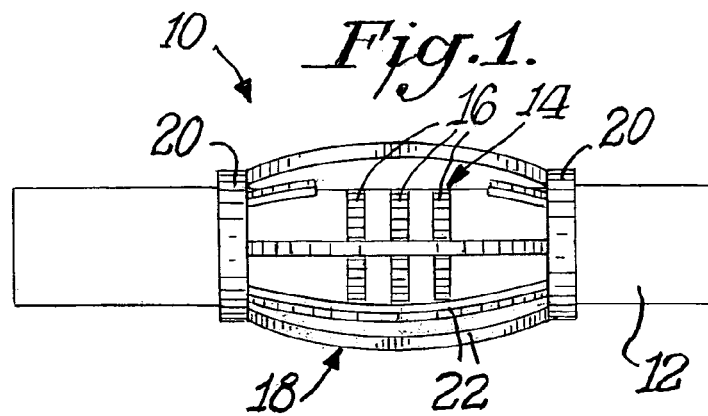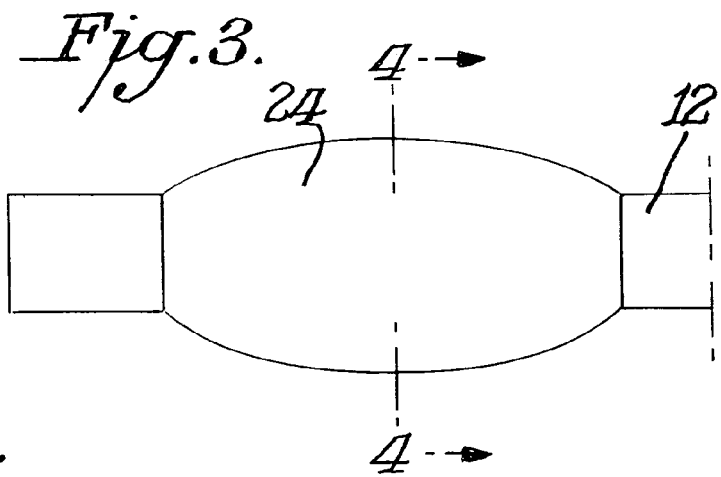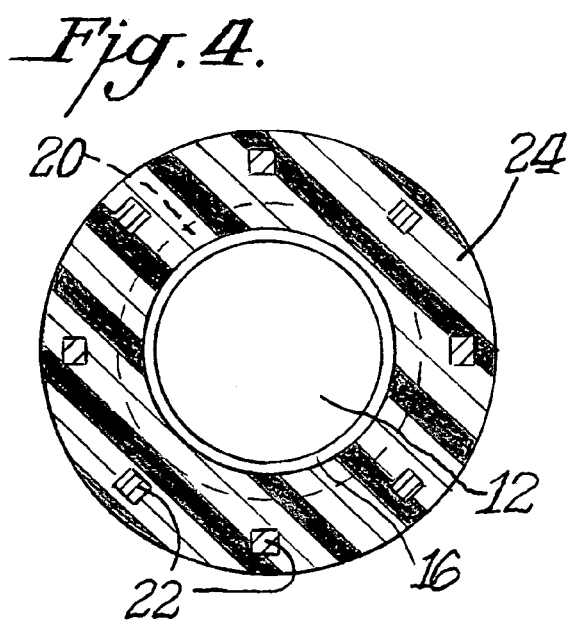

FIBER BRAGG GRATING COMPRESSION SENSOR SYSTEM

CROSS-REFERENCE TO RELATED APPLICATION

This application claims benefit under 35 U.S.C. §119(e) to U.S. Provisional Patent Application Ser. No. 60/523,370, filed Nov. 19, 2003, the entire contents of which are incorporated herein by reference.

STATEMENT OF GOVERNMENT RIGHTS

The United States Government has a paid-up license in the present invention and the right in limited circumstances to require the patent owner to license others on reasonable terms as provided for by the terms of contract No. R43 HD44288-01 awarded by the National Institutes of Health.

BACKGROUND OF THE INVENTION

A. Field of the Invention

The present invention relates generally to compression sensors, and, more particularly to a fiber Bragg grating compression sensor system.

B. Description of the Related Art

Fiber Bragg gratings are widely used as force and temperature sensors in civil engineering. A change in the length of the grating along its long axis results in a change in the center reflection wavelength. However, fiber Bragg gratings are less sensitive to compression forces limiting their application for measurements in compression loading configurations.

Fiber optic tendon and ligament force sensors have been studied in the past. These sensors were based upon optical transmission through the fiber. They have been found to be undesirable due to the fact that it is difficult to distinguish between transmission losses in the tendon or bending of skin around the tendon. Other researchers have used multimode fiber optic sensors based on transmission losses, but not fiber Bragg gratings.

Thus, there is a need in the art for a fiber optic-based sensor that is useful in compression loading configurations.

SUMMARY OF THE INVENTION

The present invention solves the problems of the related art by providing a fiber Bragg grating compression sensor and a novel flexure mount that is attached to the grating to significantly enhance its compression sensitivity. By incorporating a novel flexure mount, compressive forces are converted to tensile forces allowing an entire new set of measurement possibilities. The present invention may be used in implantable tendon and ligament force sensing or as a generalized compression sensor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a side elevational view, partially broken, of a fiber Bragg grating compression sensor system in accordance with an embodiment of the present invention;

FIG. 2 is a left elevational view of the fiber Bragg grating compression sensor system shown in FIG. 1;

FIG. 3 is a side elevational view of the fiber Bragg grating compression sensor system shown in FIGS. 1 and 2, and showing the fiber Bragg grating compression sensor system completely encased in an encapsulation material; and FIG. 4 is an enlarged cross-sectional view in elevation of the fiber Bragg grating compression sensor system shown in FIGS. 1–3, taken along line 4—4 of FIG. 3.

DETAILED DESCRIPTION OF EMBODIMENTS OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The present invention is broadly drawn to a fiber Bragg grating compression sensor arrangement or system, as depicted in FIGS. 1–4, and is designated generally as reference numeral 10. The fiber Bragg grating compression sensor system 10 includes an optical fiber 12 having a fiber Bragg grating ("FBG") sensor 14 with multiple gratings 16 provided therein, and a flexure mount 18 provided around optical fiber 12 where FBG sensor 14 is located. Flexure mount 18 is preferably mounted to be centered over the FBG sensor 14, as shown in the Figs.

FBG sensor 14 may have any number of gratings 16 provided therein and thus may have multiple lengths depending upon the application. Flexure mount 18 should be sized to surround FBG sensor 14 regardless of the length of FBG sensor 14. Optical fiber 12 may also include multiple FBG sensors 14 and corresponding multiple flexure mounts 18. Optical fiber 12 may include any conventional optical fiber, including but not limited to multimode fiber, single-mode fiber, etc. FBG sensor 14 may include any conventional FBG sensor. The physical principle behind FBG sensor 14 is that a change in strain, stress, or temperature will alter the center of the wavelength of the light reflected from FBG sensor 14. The index of refraction of optical fiber 12 depends upon the density of the dopants it contains. FBG sensor 14 may be made by redistributing dopants to create areas that contain greater or lesser amounts, using a technique called laser writing. The wavelength filter of FBG sensor 14 includes a series of perturbations in the index of refraction (gratings 16) along the length of the doped optical fiber 12. Gratings 16 reflect a narrow spectrum that is directly proportional to the period of the index modulation ($\Lambda$) and the effective index of refraction (n).

The wavelength at which the reflectivity peaks, call the Bragg wavelength ($\lambda B$), is expressed by $\lambda B = 2n\Lambda$. Because temperature and strain directly affect the index modulation ($\Lambda$) and the effective index of refraction (n), any change in temperature and strain directly affects the Bragg wavelength. For example, in the 1,550-nm (C-Band) window, the main telecommunications transmission frequency, a change in mechanical or thermal strain on FBG sensor 14 may result in a wavelength/strain sensitivity of 1.2 pm/microstrain and a wavelength/temperature sensitivity of 10 pm/° C. The length of gratings 16 of FBG sensor 14 maybe five (5) millimeters, although lengths of up to one-hundred (100) centimeters are being developed for civil engineering applications.

FBG sensor 14 may be fabricated by writing an index grating directly on a doped optical fiber. Two intense ultraviolet beams may be angled to form an interference pattern with the desired periodicity, which is written on one side of a bare fiber after the external coatings have been stripped away. The pattern's intense bright and dark bands cause local changes in the index of refraction by the migration of the dopants in the fiber. After the grating is written on the fiber, it may be recoated with polyamide.

Furthermore, many FBG sensors may be written on a single optical fiber, which requires careful consideration of each FBG sensor's specifications. For example, the allowable strain range for any given FBG sensor depends on the available optical bandwidth. When placing many FBG sensors on a single fiber, each sensor must have its own wavelength segment so that various signals do not overlap. As the FBG sensors undergo strain, they shift in wavelength within their allotted optical bandwidth range. In general, there should be a 0.5-nm wavelength buffer between sensor channels. The maximum change in wavelength of each FPG sensor and thus, the distance between each channel, depends on the application.

Flexure mount 18 may include a pair of collars 20 connected together with a plurality of bowed flexible ribs 22. Collars 20 may be integrally formed with ribs 22, but may also be separate from but connected to ribs 22. Collars 20 are preferably sized to be provided around the circumference or periphery of optical fiber 12, and the size of collars 20 are dependent upon the size (e.g., the radius) of optical fiber 12. Any number of bowed flexible ribs 22 may be provided for flexure mount 18, and flexure mount 18 is not limited to the eight ribs shown in the Figs. The length of bowed flexible ribs 22 will depend upon the length of FBG sensor 14. Flexure mount 18 may be made from a variety of materials, including but not limited to metals (aluminum, steel, aluminum alloy, etc.), thermoplastics, natural rubber, synthetic rubber, etc. Flexure mount 18 may be constructed by machining a thin piece of metal tubing to produce ribs 24. The tubing may be axially compressed to produce permanent deformation.

Flexure mount 18 may be positioned over FBG sensor 14 and connected or retained on optical fiber 12 by gluing collars 20 onto optical fiber 12. FBG sensor 14 and flexure mount 18 may be encased or encapsulated with an encapsulating material 24. Encapsulating material 24 may be made from a variety of materials, including but not limited to silicone, epoxy, natural rubber, synthetic rubber, thermoplastic, etc. Encapsulating material 24 preferably completely encases flexure mount 18, although portions of flexure mount 18 may be visible or not encased.

As discussed above, FBG sensors are less sensitive to compressive forces, which limit their application for measurements in this loading configuration. By incorporating flexure mount 18 with FBG sensor 14, compressive forces are converted to tensile forces, allowing an entirely new set of measurement possibilities for FBG sensor 14. Compressive forces or pressure that acts on flexure mount 18 are transmitted into tensile forces on optical fiber 12 which stretch the gratings 16 of FBG sensor 14 and result in a change in the grating center wavelength. Encapsulating material 24 may provide a reaction force to increase the dynamic range of FBG sensor 14. The circular symmetry of flexure mount 18 makes FBG sensor 14 insensitive to rotational positioning.

To measure wavelength shifts that result directly from changes in temperature or tension, fiber Bragg grating compression sensor system 10 includes an optical source (not shown) that continuously interrogates the reflection spectrum, and a detection module (not shown) that records the shifts in the peak reflectivity versus wavelength. The overall sensitivity of system 10 will depend directly on the wavelength accuracy of the source and the detection module, wherein the better the accuracy, the higher the sensitivity. However, higher wavelength accuracy often results in slower update rates, or scan frequencies, and less-frequent monitoring of sensors.

The scan frequency is a combination of the speed of the optical source, the bandwidth of the detectors, the data acquisition rate, and the rate at which the analysis of the wavelength shift can be performed. For applications such as maintenance checks of an airplane's structural integrity, the slower, but more accurate, systems are desirable. In other applications for which in situ monitoring is required, high update rates are more important.

In a simple form, fiber Bragg grating compression sensor system 10 may use a broadband light source, such as an amplified-spontaneous-emission (ASE) white-light source, with a tunable filter and a detector. Because detectors are wavelength-insensitive, a tunable wavelength filter is required to scan the wavelength range of the FBG sensors, typically 40 nm, to determine the Bragg wavelength. The main advantage of these systems is their lower cost. However, because the output power from the ASE white-light source is low, only a limited number of in-line gratings can be measured, and with a limited dynamic range. Moreover, the requirement of an external wavelength filter limits the accuracy and scan frequency of these systems. A fiber laser may also be used if more measurements are desired. ECDLs (External Cavity Diode Laser) provide even higher output power than fiber lasers, which increases the number of sensors and the dynamic range.

The fiber Bragg grating compression sensor system 10 of the present invention provides many advantages over the related art. For example, by using FBG sensors, the fiber Bragg grating compression sensor system 10 of the present invention monitors spectral information that is changed only in the object under measurement, such as a tendon. The present invention is not affected by bending of the fiber due to skin effects. In addition, by monitoring the reflected center wavelength of the grating, it is not necessary to insert the fiber completely through the tendon. It can be inserted like an acupuncture needle into the center of the tendon. Previous fiber optic sensors for measuring tendon forces required that the fiber be inserted completely through the tendon and reconnected on the other side.

The fiber Bragg grating compression sensor system 10 of the present invention may be utilized as a general tool for a wide range of biomechanics research. In addition, it may be useful in Magnetic Resonance Imaging (MRI) studies because the system is based upon optical methods. FBG sensors are also immune to magnetic effects. Electronic sensors cannot be utilized in MRI environments because of interference of magnetic fields. A further application of the present invention could be in limb re-attachment surgery and limb reconstruction surgery where muscle and tendon control can be monitored as the surgical procedure is occurring.

Due to the small size of fiber Bragg grating compression sensor system 10, an original application was the measurement of tendon and ligament forces (an implantable biosensor). However, fiber Bragg grating compression sensor system 10 could be used in civil engineering for monitoring stresses in bridges and buildings. It could also be used for measuring compressive stresses in other structures such as airplane wings, rockets, satellites, and other aerospace applications.

The performance of flexure mount 18 determines the range of forces that can be measured by the center wavelength shift of the FBG sensor 14. Further optimization can be achieved by investigating material selection, strut dimensions, and initial deflection of flexure mount 18.

It will be apparent to those skilled in the art that various modifications and variations can be made in the fiber Bragg grating compression sensor system of the present invention and in construction of the fiber Bragg grating compression sensor system without departing from the scope or spirit of the invention. Examples of such modifications and variations have been previously provided above.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A flexure mount for use with a fiber Bragg grating sensor of an optical fiber, comprising:
   a pair of collars surrounding and connected to a periphery of the optical fiber;
   a plurality of bow-shaped flexible ribs interposed between and connecting said collars together, wherein the flexible ribs are arranged substantially parallel along the optical fiber axis; and
   an encapsulating material surrounding said collars and said plurality of bow-shaped flexible ribs.

2. A flexure mount as recited in claim 1, wherein the flexure mount converts compressive forces to tensile forces.

3. A flexure mount as recited in claim 2, wherein the compressive forces that act on the flexure mount are transmitted into tensile forces on the optical fiber which stretch the gratings of the fiber Bragg grating sensor and result in a change in the grating center wavelength.

4. A flexure mount as recited in claim 1, wherein said encapsulating material provides a reaction force to increase the dynamic range of the fiber Bragg grating sensor.

5. A flexure mount as recited in claim 1, wherein said collars and said plurality of bowed flexible ribs are integrally formed.

6. A flexure mount as recited in claim 5, wherein said collars and said plurality of bowed flexible ribs comprise a material selected from the group consisting of aluminum, steel, aluminum alloy, thermoplastic, natural rubber, and synthetic rubber.

7. A flexure mount as recited in claim 1, wherein said encapsulating material comprises a material selected from the group consisting of epoxy, natural rubber, synthetic rubber, and thermoplastic.

8. A fiber Bragg grating compression sensor system, comprising:
   an optical fiber having a fiber Bragg grating sensor provided at a portion thereof; and
   a flexure mount comprising a pair of collars surrounding and connected to a periphery of the optical fiber, a plurality of bow-shaped flexible ribs interposed between and connecting the collars together, wherein the ribs are substantially parallel along the optical fiber axis, and an encapsulating material surrounding the collars and the plurality of bow-shaped flexible ribs.

9. A fiber Bragg grating compression sensor system as recited in claim 8, wherein the flexure mount converts compressive forces to tensile forces.

10. A fiber Bragg grating compression sensor system as recited in claim 9, wherein the compressive forces that act on the flexure mount are transmitted into tensile forces on the optical fiber which stretch the gratings of the fiber Bragg grating sensor and result in a change in the grating center wavelength.

11. A fiber Bragg grating compression sensor system as recited in claim 8, wherein the encapsulating material provides a reaction force to increase the dynamic range of the fiber Bragg grating sensor.

12. A fiber Bragg grating compression sensor system as recited in claim 8, wherein the collars and the plurality of bowed flexible ribs are integrally formed.

13. A fiber Bragg grating compression sensor system as recited in claim 12, wherein the collars and the plurality of bowed flexible ribs comprise a material selected from the group consisting of aluminum, steel, aluminum alloy, thermoplastic, natural rubber, and synthetic rubber.

14. A fiber Bragg grating compression sensor system as recited in claim 8, wherein the encapsulating material comprises a material selected from the group consisting of epoxy, natural rubber, synthetic rubber, and thermoplastic.

* * * * *